United States Patent [19]

Huber et al.

[11] Patent Number: 5,213,201

[45] Date of Patent: May 25, 1993

[54] ELECTRONIC CONTROL ASSEMBLY FOR DRIVE ROLLER UNITS

[75] Inventors: Thomas Huber, Iffeldorf; Peter Sütsch, Feldgeding, both of Fed. Rep. of Germany

[73] Assignee: Bavaria Cargo Technologie GmbH, Fed. Rep. of Germany

[21] Appl. No.: 828,274

[22] Filed: Jan. 30, 1992

[30] Foreign Application Priority Data

Jan. 31, 1991 [DE] Fed. Rep. of Germany ....... 4102903

[51] Int. Cl.[5] .............................................. B65G 13/06
[52] U.S. Cl. .................................. 198/781; 244/137.1
[58] Field of Search ............... 198/575, 781, 782, 788, 198/369, 372; 193/35 SS, 35 MD; 244/137.1

[56] References Cited

U.S. PATENT DOCUMENTS

| | | | |
|---|---|---|---|
| 3,174,613 | 3/1965 | Insolio | 198/782 X |
| 4,006,869 | 2/1977 | Vogele | 244/137.1 |
| 4,019,627 | 4/1977 | Eggert et al. | 198/415 X |
| 4,819,782 | 4/1989 | Fenner | 244/137.1 X |
| 4,860,973 | 8/1989 | Fenner | 244/137.1 |
| 4,926,999 | 5/1990 | Fauth, Sr. et al. | 198/372 X |
| 5,058,727 | 10/1991 | Jahns et al. | 198/575 X |

FOREIGN PATENT DOCUMENTS

| | | | |
|---|---|---|---|
| 0223441 | 5/1987 | European Pat. Off. | 198/781 |
| 3222028 | 1/1983 | Fed. Rep. of Germany | 198/781 |

*Primary Examiner*—Robert P. Olszewski
*Assistant Examiner*—James R. Bidwell
*Attorney, Agent, or Firm*—Sughrue Mion Zinn Macpeak & Seas

[57] ABSTRACT

In a control assembly for a freight loading system having a plurality of drive roller units, each drive roller unit has an electronic control arrangement associated therewith for detecting operating parameters which characterize the instantaneous operating condition of the associated drive roller unit. Information signals are derived from the operating parameters and interchanged between the drive roller units to control the sequence of operation thereof.

6 Claims, 4 Drawing Sheets

ELECTRONIC CONTROL ASSEMBLY FOR DRIVE ROLLER UNITS

BACKGROUND OF THE INVENTION

A typical form of freight loading system, which is used for example in an air freight traffic context, comprises a conveyor surface over which are distributed an array of drive roller units, each of which has a motor for driving same, for displacing articles to be loaded or unloaded, such as freight containers. Thus, such a system may be used for loading freight containers into a freight compartment of an aircraft and conveying the freight containers within the freight compartment to respective predetermined locations intended therefor. Such as freight loading system will often include a control assembly for controlling operation of the drive roller units.

In general the freight compartment of an aircraft is elongate in the longitudinal direction of the aircraft and at one longitudinal side at least has an entry door through which the freight container can be introduced. The floor of the freight compartment constitutes the conveyor surface, being provided with roller-type and-/or ball-type conveyor tracks or the like, and the motor-driven drive roller units are distributed thereover, to move the container when it is introduced through the loading door into the freight compartment and then move it in the longitudinal direction thereof to its intended destination.

Usually, drive roller units of that kind are arranged in the door region of the freight compartment to provide for transverse conveying, that is to say transversely with respect to the longitudinal axis of the freight compartment or the aircraft, and they are then followed in the longitudinal direction by mutually parallel rows of drive roller units for conveying articles such as freight containers in the longitudinal direction of the aircraft. Now, so that the freight container when introduced through the door into the freight compartment by the transversely conveying drive roller units can then be driven in the longitudinal direction of the freight compartment, it is necessary for the bottom surface of the freight container to cover not only the transversely conveying drive roller units in the door region, but also the longitudinally conveying drive roller units disposed in the region of the door, which adjoin the transversely conveying drive roller units in the longitudinal direction. If that were not the case, the container, after having been introduced through the door in the transverse direction, could not be further conveyed within the freight compartment in the longitudinal direction.

In a practical context a freight loading system of that kind gives rise to a number of problems.

Usually, such freight loading systems are equipped with drive roller units which in functional terms approximately correspond to those disclosed in German patent application No. P 37 24 126.5 (corresponding to U.S. Pat. No. 4,792,037) to which reference may therefore be directed.

If with that arrangement the freight loading system is activated for loading a freight container, all the drive rollers of the drive roller units firstly rise out of their lowered rest position into a raised operative position and begin to rotate. The freight container is therefore conveyed transversely to the longitudinal axis of the aircraft by the drive roller units which operate in the transverse direction, in the region of the door, until the freight container reaches the opposite side wall of the freight compartment. In order now to avoid overloading of the transversely conveying drive roller units by virtue of the freight container running against the side wall of the freight compartment, either the prior arrangement has limit switches which switch off the transversely conveying drive roller units when the freight container encounters the side wall of the freight compartment which is opposite the door, or there is an external control switch which must be actuated by an operator as soon as the freight container begins to encounter the side wall of the freight compartment. It is unfortunately found in practice that under the rough operating conditions of a freight loading system the limit switches frequently suffer damage and fail so that excessive loadings which occur when the container encounters the freight compartment side wall cause overloading of and progressive damage to the drive roller units involved. A switch which can be manually actuated by an operator provides only a limited remedy in this respect for it may happen that the operator can easily forget to actuate the manual switch.

A further problem which is often particularly serious can arise if, as already mentioned above, when the container is being loaded into the freight compartment of the aircraft through the door, the bottom surface of the container comes into contact not only with transversely conveying drive roller units but also longitudinally conveying drive roller units which are necessarily arranged adjacent thereto. It is therefore absolutely necessary to ensure that, when the container is loaded in the transverse direction, the adjacent longitudinally conveying drive roller units are moved into the lowered position. In the prior arrangement that is achieved by suitable switches which are disposed in the path of movement of the container or by manual actuation on the part of an operator. In that respect the same considerations as those indicated above also apply. The longitudinally conveying drive roller units which are disposed in the door region may frequently suffer damage as a result.

Similar considerations as those set forth above in relation to the transversely conveying drive roller units also apply in relation to the longitudinally conveying drive roller units which are at the front and rear ends of the freight compartment as, when a freight container encounters an end wall of the freight compartment, it is necessary to ensure that the longitudinally conveying drive roller units which are still in operative engagment with the underneath surface of the freight container are switched off in order to prevent overloading and overheating.

In conventional freight loading systems, all drive roller units, or at least in each case the transversely conveying units or all the longitudinally conveying units, are simultaneously switched into the operative conveying condition although there is only ever a small number of drive roller units that contribute to conveying of the freight container, namely those which are disposed beneath the underneath surface of the container at any given time. That gives rise to the problem that the other drive roller units which are running in an idle condition not only consume power unnecessarily but in addition for most of the time are also uselessly in the idle drive condition so that their service life is reduced.

SUMMARY OF THE INVENTION

An object of the present invention is to provide an electronic control assembly for drive roller units of a freight loading system, which can provide a higher degree of operating reliability on the part of the system in conjunction with a longer service life for the drive roller units.

Another object of the invention is to provide an electronic control assembly for drive roller units in a freight loading system, which is capable of providing for selective control of the drive roller units as actually required.

Still another object of the present invention is to provide a freight loading system with an electronic control assembly for drive roller units, which has incorporated safeguards against improper functioning of the arrangement.

In accordance with the principles of the present invention the foregoing and other objects are achieved by the invention set forth herein.

The present invention provides that, without switches which have to be actuated by the freight container or like article being conveyed or switches which have to be manually actuated by external intervention by an operator, the operational situation is always such that, when a container passes into the freight compartment of an aircraft in the transverse direction, the longitudinally conveying drive roller units which are disposed in the region of the door of the freight compartment are certain to be in a lowered position so as to prevent them from suffering damage. That is achieved by virtue of the fact that the drive roller units which are operative to convey in the transverse direction of the freight compartment can only be set in operation by an external control switch when their respective electronic control arrangements receive confirmation that the drive roller units which are operative to convey in the longitudinal direction of the freight compartment are in the lowered position. Conversely that also applies in regard to the drive roller units which are operative to convey in the longitudinal direction, those units being moved into their drive position by the external control switch only when their respective electronic control arrangements have received the information that the drive roller units which are operative to convey in the transverse direction are in the lowered position. That ensures that each drive roller unit which is in the active, driving condition is switched off if either the loading on its drive roller becomes excessively great or if its temperature rises above a given value.

Finally the system according to the invention ensures that it is only ever that proportion of the drive roller units which are actively contributing to conveying of a freight container, that is supplied with power over a prolonged period of time, thus avoiding prolonged idle operation of the drive roller units.

Further objects, features and advantages of the present invention will be apparent from the following description of a preferred embodiment thereof.

DESCRIPTION OF THE PREFERRED EMBODIMENT

Figure 1:
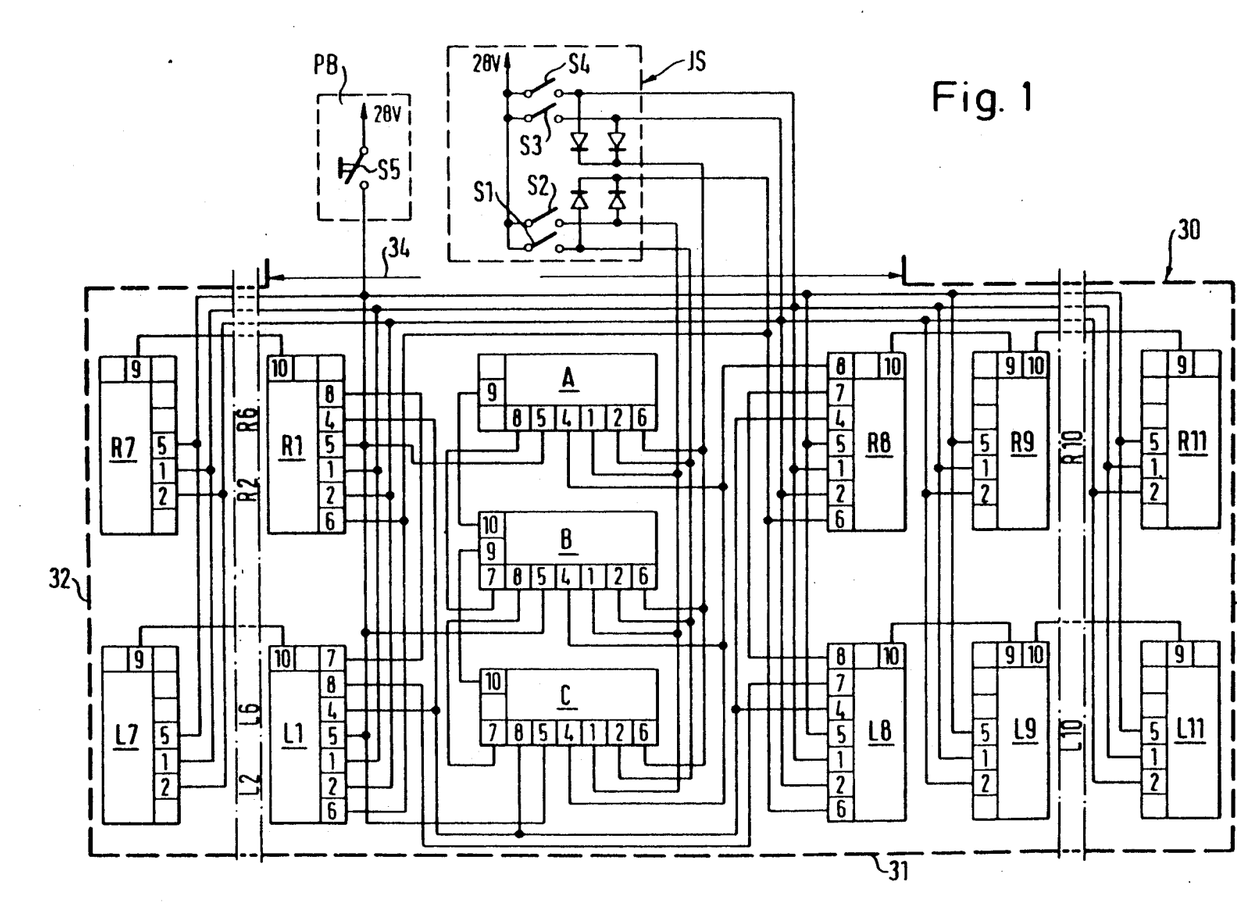
FIG. 1 is a partly simplified schematic wiring diagram of drive roller units of a conveyor surface in an aircraft freight compartment, the units being provided with electronic control arrangements.

Referring firstly to FIG. 1, shown therein in highly diagrammatic form is a freight loading system having a conveyor surface as indicated in broken line and identified by reference numeral 30, formed by the floor of the freight compartment of a freight aircraft. The conveyor surface 30 is delimited at the lower edge thereof in the drawing by a side wall of the aircraft freight compartment, as indicated at 31, while at the left and right sides of the drawing the conveyor surface is defined by the front wall 32 and the rear wall 33 of the freight compartment. The conveyor surface 30 may be for example in the form of roller-type conveyor tracks or ball-type conveyor tracks or another equivalent arrangement on which articles such as freight compartment containers can be moved.

Disposed at the edge of the conveyor surface 30, which is the upward edge thereof in FIG. 1, is a door region which permits containers to be introduced into and removed from the freight compartment. The door region is shown at 34.

A plurality of drive roller units, which can also be referred to as power drive units (which in turn may be abbreviated to PDU), is distributed in a special array over the conveyor surface 30. The drive roller units serve to drive and move the freight containers on the conveyor surface 30.

In FIG. 1, the individual drive roller units are symbolically represented by rectangular boxes R1 through R11, L1 through L11 and A, B and C. In that connection the longitudinal direction of the respective rectangular boxes corresponds to the axis of drive rotation of the respective drive roller unit, in other words, the drive for the freight container is perpendicular to the long sides of the individual rectangular boxes.

As can be seen from FIG. 1, three drive roller units A, B and C are arranged in the door region, transversely with respect to the longitudinal axis of the floor 30 of the freight compartment, in such a way that the direction of vonveying movement of those drive roller units is transverse with respect to the longitudinal axis of the floor 30 of the freight compartment, so that those drive roller units are operable to move a freight container from outside the freight compartment into the interior thereof or to remove a freight container from the freight compartment, when the direction of rotation of the drive roller units is reversed. Adjoining the drive roller units A, B and C in directions towards the front wall 32 and the rear wall 33, in the longitudinal direction of the freight compartment floor 30, are further drive roller units which are arranged in first and second rows R1 through R11, L1 through L11 respectively and which are disposed in succession at fixed spacings from each other in the longitudinal direction of the freight compartment floor 30.

In order to simplify the drawing, between the drive roller units R1 R7 and L1, L7 respectively, a corresponding part of the freight compartment floor 30 has been omitted, which carries the drive roller units R2 through R6, L2 through L6 respectively. Similarly, a part of the freight compartment floor 30 which carries the drive roller units R10 and L10 has been omitted between the drive roller units R9, R11 and L9, L11 respectively. The wiring for the individual electronic control arrangements of the individual drive roller units is also shown in a simplified form by virtue of omission of the power supply lines. FIG. 1 however does show the connection of the information and control lines of the individual electronic control arrangements with each other and the connection to an external control lever or joystick as indicated at JS which includes the individual switches S1, S2, S3 and S4 as well as a push-button switch S5, in the switch unit PB.

The individual drive roller units may be of the kind described in above-mentioned German patent application No P 37 24 126.5 and European patent application No 88 103528.1 (European patent No 0 300 127; corresponding to U.S. Pat. No. 4,792,037), and in European patent applications Nos 90 102494.3, 90 102495.0 and 90 102497.6. More especially the following description refers by way of example to the use of a drive roller unit which is described in German patent application No P 41 02 424.9 which has a filing date of Jan. 28, 1991 and which corresponds to U.S. patent application Ser. No. 07/814,805, filed Dec. 31, 1991 reference therefore being directed thereto for incorporation of the disclosure thereof into this specification. More specifically that drive roller unit is distinguished in that, when the motor power is switched off with the drive roller unit being in the condition of being pressed against a freight container, the unit is locked in that position by a special brake so that the freight container is prevented from rolling away by virtue of the locked drive roller unit. In that drive roller unit, the locked condition can be removed by a control command so that the drive roller of the unit can fall back from its raised locked position into the lowered rest condition so as to release the freight container for movement thereof.

Figure 2:
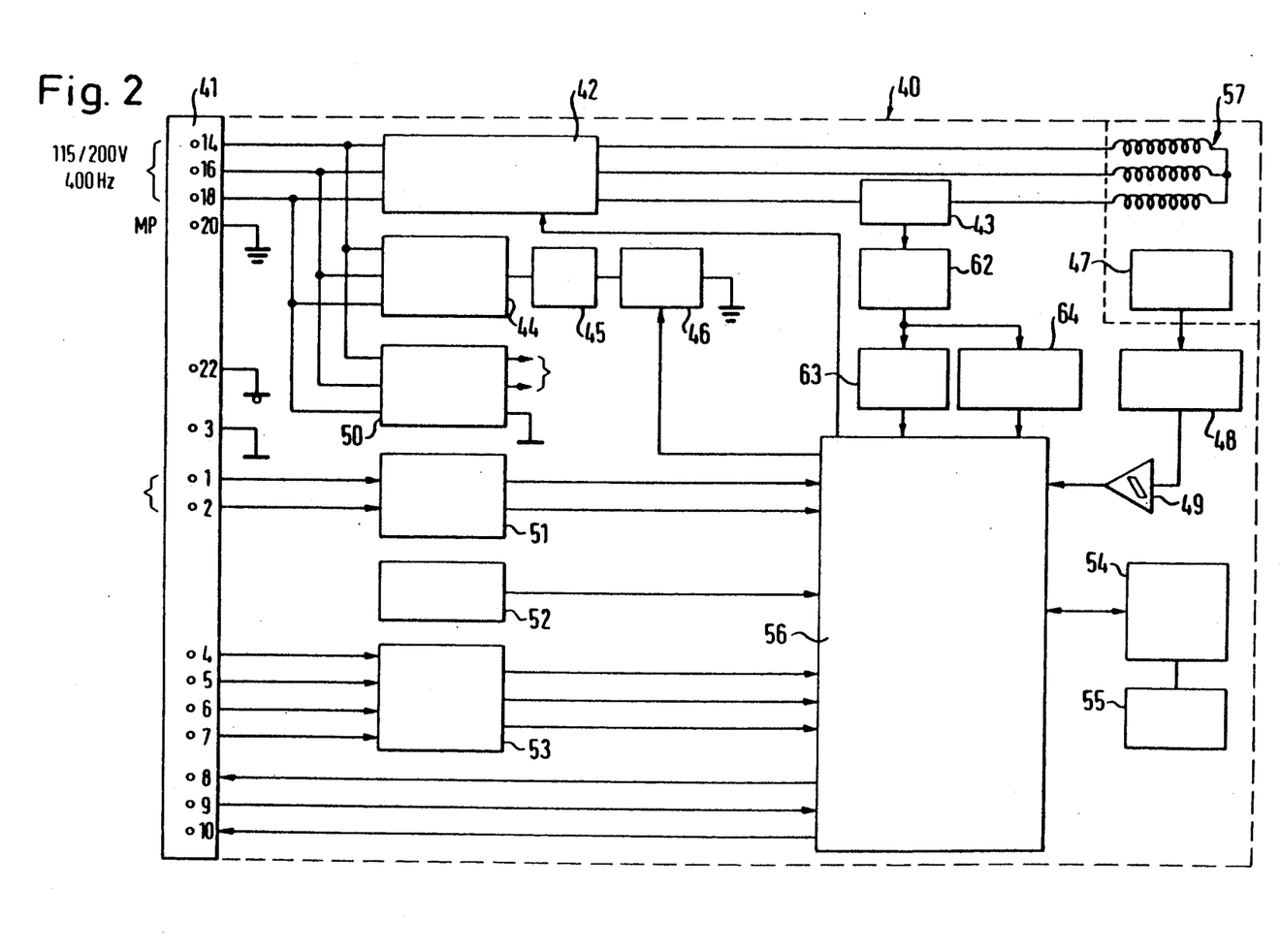
FIG. 2 shows a block circuit diagram of an electronic control arrangement of the drive roller units shown in FIG. 1.

Reference will now be made to FIG. 2 showing a block circuit diagram of an electronic control arrangement 40 associated with each individual drive roller unit over the entire conveyor surface or freight compartment floor 30. The control arrangement 40 may be accommodated in each individual drive roller unit, or parts of the control arrangement may be provided in part in the respectively associated drive roller unit and in part combined together at a central location.

At any event the electronic control arrangement gives each individual drive roller unit independent operability and properties which afford self-protection from damage. For that purpose, the electronic control arrangement 40 includes sensing or measuring elements, and items of information and control signals which are ascertained thereby and supplied from the exterior are logically interrelated in such a way that the respective drive roller unit is only ever supplied with drive power when that is necessary and is permissible without the risk of damage. By virtue of the actual operating time being reduced to the period which is absolutely necessary and by virtue of the protection from overloading and damage, this system can give an increased operational lifetime.

The system involves information interchange about the respective operating condition from one drive roller unit to the other, and that is achieved by the wiring configuration shown in FIG. 1 which will also be described hereinafter with further reference to FIG. 2. More specifically, inter alia the signals in respect of the operating conditions of the drive roller units A, B, C in the door region must be taken into account in particular for operation of the adjacent drive roller units R1, R8 and L1, L8 in order to ensure that the units R1, R8 and L1, L8 which are operative to convey a container in the longitudinal direction are not damaged, in their raised position, when a freight container is moved by the transversely conveying drive roller units A, B and C in the door region. Naturally the converse also applies, that is to say, the system provides a suitable information exchange to ensure that the transversely conveying drive roller units A, B and C must be in the lowered position so that the adjacent longitudinally conveying drive roller units can be actuated to produce a conveying movement.

Reference will now be made more especially to FIG. 2 to describe the individual components of an electronic control arrangement 40 which is used for the above-indicated purpose:

The control arrangement 40 includes a switch arrangement 42 comprising five power switches, for example semiconductor switches, which serve on the one hand to switch on and off three phase lines of the power supply for the three-phase motor 57 of the associated drive roller unit, while on the other hand the power switches also serve to switch over two of the three phases in order to reverse the direction of rotation of the motor 57. For the supply of power, a three-phase 115/200 V and 400 Hz supply network is connected to the terminals 14, 16 and 18 of the terminal strip 41 while the terminal 20 thereof is connected to the neutral point MP of the power supply.

The current consumption in one of the phase lines of the motor 57 is continuously measured and monitored by a current sensor 43. The output signal of the current sensor 43 is passed by way of an interface 62 to a level detector 63 and a signal variation detector 64 and from the latter to a control logic circuit 56. Those signals give the basic information for deriving internal control commands and for generating the operating condition output signals to the adjacent drive roller units.

In addition, connected to the terminals 14, 16 and 18 of the member 41 is a power supply unit 44 for locking the drive roller of the drive roller unit in the raised position or for lowering the drive roller. The power supply unit 44 feeds a solenoid coil 45 which is disposed in the drive roller unit and which in the activated condition provides that the raised drive roller unit remains in the raised position. Activation of the coil 45 occurs by way of a power switch 46, by a corresponding command from the control logic circuit 56. The power switch 46 is a normally closed switch which is opened in response to a command from the control logic circuit 56 when a lowering command is received either by way of the external control lever or joystick JS on the terminal 6 or the external lowering switch S5, on terminal 5, through the terminal strip 41. If a command of that kind occurs at the power switch 46, the drive roller can move downwardly from its locked raised position into the lowered rest position. That means that the drive roller of a drive roller unit remains in the raised position thereof as long as the 115/200 V three-phase power is applied to the unit and the power switch 46 does not interrupt the connection to the ground of the system at terminal 20.

A temperature sensor 47 is disposed at a suitable location within the respective drive roller unit and in good thermal contact with the housing. The temperature sensor 47 generates an overheating signal as soon as the temperature that it measures exceeds a predetermined upper limit. That signal has the highest priority among all signals and immediately cuts off the supply of power to the motor 57 of the associated drive roller unit. The drive roller unit can then no longer be switched on again until the sensed temperature has fallen to a lower predetermined value. In order to achieve that, the temperature sensor 47 is connected by way of a matching circuit 48 and a voltage comparator 49 with a hysteresis action to the control logic circuit 56 which guarantees the desired function, on the basis of the signals supplied by the temperature sensor 47.

The power supply unit 50 for the electronic circuits is also fed by the three-phase supply network at the terminals 14, 16 and 18. Firstly the ac voltage of the supply network is rectified and filtered. Then it is adjusted to the required value or values by way of a dc/dc converter within the power supply unit 50. The advantage of such an assembly is that the dc voltage ground (terminal 3 of the terminal strip 41) can be kept separate from the neutral point of the three-phase supply network (at terminal 20 of the terminal strip 41). The above-described structure of the power supply unit 50, in terms of its electronics, further permits the system to be simple in design as well as being low in weight and affording a high degree of reliability when using electronic C-MOS-components.

In the joystick command interface 51 the command signals which are supplied by way of the joystick from the on-board system of the freight aircraft with a 28 V dc voltage are filtered and the level thereof is shifted to values which can be processed by the control logic circuit 56. The two inputs at the terminals 1 and 2, by way of the control logic circuit 56, provide for switching over of the phase sequence in the switch assembly 42 so that the direction of rotation of the motor 57 can be reserved to correspond to the position of the switches S1 through S4 in the joystick indicated at JS in FIG. 1.

In that connection it is to be noted that the switches S1 and S2, for moving a freight container into and out of the freight compartment in the door region thereof, are only connected to the terminals 1 and 2 of the transversely conveying drive roller units A, B and C in the freight compartment door region, while the switches S3 and S4 are connected to the terminals of the other longitudinally conveying drive roller units. Furthermore the electronic control arrangement 40 includes a lowered position switch 52 which is accommodated in the respective drive roller unit and which is in the form of a microswitch and which is closed as long as the drive roller unit is not in the completely lowered position. The operating condition signal which is produced by that switch 52 is passed for further use to the control logic circuit 56.

The terminals 5 and 6 of the terminal strip 41 receive lowering command signals which are supplied by external items of equipment. The pushbutton switch S5 is in that respect applied directly to the terminal 5, actuation of that switch S5 passing a lowering command to all drive roller units of the conveyor surface or freight compartment floor 30. In contrast the terminal 6 is connected by way of an OR-circuit comprising two diodes either to the switches S1 and S2 of the joystick JS or by way of a further OR-circuit comprising two diodes to the switches S3 and S4. In that respect the terminal 5 affords the option of lowering all drive roller units simultaneously by virtue of the external pushbutton switch S5 being pressed, as long as the three-phase power supply is available. The other terminal 6 is only connected to the drive roller units A, B and C and R1, R8, L1 and L8 in the freight compartment door region.

Those circuitry arrangements provide that the drive roller units which are conveying in the longitudinal direction are always lowered when the switches S1 and S2 are actuated for moving the freight container into and out of the freight compartment by means of the drive roller units A, B and C in the freight compartment door region. Conversely, a signal is supplied to the drive roller units A, B and C which are operable to convey a container in the transverse direction, at the terminal 6, by the switches S3 and S4 of the joystick JS, if the joystick JS is actuated to produce a conveying effect in the forward-rearward direction. In that way a lowering signal is automatically passed to those respective drive roller units which would prevent a conveying operation on the part of the respective other drive roller units.

A drive enable signal for the transversely conveying drive roller units A, B and C is passed to the terminal 4 of the terminal strip 41 only when the adjacent longitudinally conveying drive roller units R1, R8 and L1, L8 are all in the lowered position. That excludes the risk of damage to those last-mentioned drive roller units when transversely conveying a container or when moving a container into or out of the freight compartment. In regard to the longitudinal conveying drive roller units R1, R8 and L1, L8, a signal which is produced in an identical fashion by the transversely conveying drive roller units A, B and C occurs at the terminal 4, thereby also excluding damage to the above-indicated longitudinally conveying drive roller units.

In order to provide for the necessary exchange of information between the drive roller units of the whole conveyor surface, there are five information lines, of which however three are exclusively connected to the drive roller units A, B, C, R1, R8, L1 and L8 in the freight compartment door region.

All those drive roller units which are provided for the same direction of conveying movement (in the longitudinal direction or in the transverse direction) are respectively connected together in series whereby each individual drive roller unit receives an operating condition signal from the preceding or next following unit at the terminals 9 or 10 respectively or passes an operating condition signal to the next following or preceding unit by way of the terminal 9 or 10 respectively. Those operating conditions correspond to load conditions which ensue from current measurement in respect of the associated drive roller units. The information flow depends on the selected conveying direction of the respective row or series of drive roller units, the flow of information being controlled by the corresponding control commands of the joystick JS by way of the control logic circuit 56.

Drive roller units within the door region, namely A, B, C, R1, R8, L1 and L8 are additionally connected together by way of the terminals 7 and 8 so that operating condition data relating to their lowered position can be interchanged. Each of the drive roller units which produce a conveying action in the longitudinal direction (or in the transverse direction respectively) receives a signal from the preceding unit, combines that condition signal with the position of its own lowered position switch 52, and passes a corresponding item of information to the next drive roller unit by way of the terminal 8. In that way, an enable signal is passed to the terminal 4, for the drive roller units which are conveying in the longitudinal direction (or in the transverse direction respectively), and that enable signal only ever enables power supply to and rotation of the motor 57 when all drive roller units which are not conveying in the same direction have reached the fully lowered position. That therefore means that motor rotation at the longitudinally conveying drive roller units is only ever enabled when all transversely conveying drive roller units A, B and C are lowered, and vice-versa.

For the purposes of time control for the control logic circuit 56, the assembly has an oscillator 55 and, controlled thereby, a timer and counter 54.

All input signals from external components and also from components within the respective drive roller unit are processed in the control logic circuit 56 which is fitted with a highly integrated individual semiconductor chip and which also produces the internal drive control commands and operating condition output signals for external components. Such a design configuration gives maximum logic combination capabilities while being of minimum structural size. Furthermore further developments and improvements in the arrangement are made possible in the development and trials phase as any necessary matching or adaptation is generally restricted to the exchange of a single integrated circuit without the need to alter the layout of the wiring system or the printed circuit board on which the electronic control arrangement is provided.

The primary functions of the electronic control arrangement can be summarised as follows:

on-off control of the motor 57 of the respective drive roller unit;

changing the phase sequence of the supply of power in dependence on the joystick control command;

continuously ascertaining the operating condition with reference to the respective motor current;

monitoring an overheating signal in respect of the drive roller unit;

monitoring the raising and lowering coil 45;

generating an output signal for indicating the lowered condition of the drive roller unit, with an internal microswitch 52, and an input signal from the other drive roller units;

assessment of external lowering commands;

reception and assessment of the operating condition signals of the other drive roller units; and transmission of the operating condition signal of the respective drive roller unit to the other drive roller units.

Figure 3:
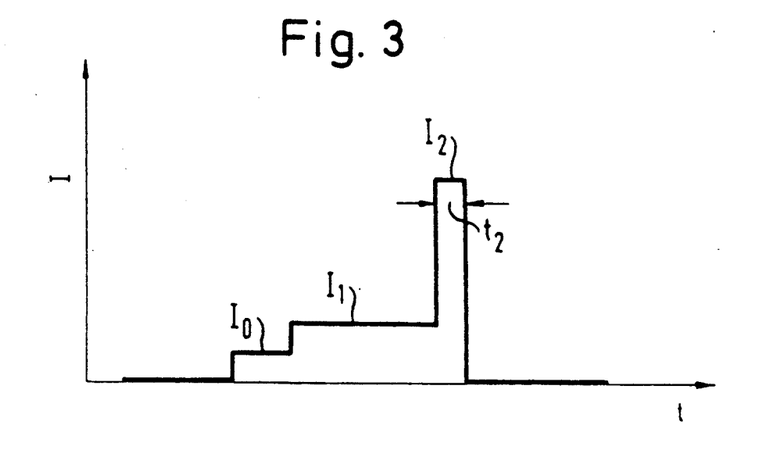
FIG. 3 is a diagram illustrating the operating conditions of a drive roller unit, which are characterised by the power consumption involved.

The mode of operation and the co-operation of the electronic control arrangements and the associated drive roller units within the conveyor surface 30 of the aircraft freight component will now be briefly described:

It is first to be noted that the operating condition of an individual drive roller unit is characterised by its instantaneous motor current consumption. FIG. 3 diagrammatically shows the variation in respect of time of the motor current consumption of a drive roller unit. As long as the power supply is switched off, the motor current I is equal to zero, corresponding to the condition 'OFF'. As soon as the power supply is switched on, by way of the switch assembly 42, the motor current I rises to a given value $I_O$ which is the 'without load' condition, as long as the rotary movement of the roller is not braked or retarded by the roller being in contact with a freight container to be conveyed. As soon as the roller begins to convey a freight container, the motor current I rises to the value $I_1$ representing the 'normal load' condition. If the loading on the drive roller unit due to a freight container lying on the roller thereof becomes excessive, because for example the freight container is already bearing against a wall, the motor is braked to a stop and a very high current occurs, referred to as the short-circuit or stall current $I_2$, which corresponds to the 'forced stoppage' or 'stall' condition.

When that condition is detected, the drive roller unit in question is switched off by the control logic circuit 56 after a predetermined period of time as indicated at $t_2$ of for example 0.5 seconds, and it can only be switched on again by the next joystick command.

However the above-described 'forced stoppage' or 'stall' condition results in overheating of the motor and resultant damage thereto. Therefore, as an additional fundamental step, the motor temperature is constantly monitored by means of the temperature sensor 47. If a predetermined temperature limit value is exceeded, the respective drive roller unit is disabled, with the highest level of priority, until the motor temperature has fallen again below a predetermined lower limit value.

The ensures that the drive roller unit in question is protected for example from being switched on again by a joystick command, even in the event of a defective control logic circuit 56 which does not detect the excessively high current $I_2$ involved in the 'stall' condition.

Figure 4:
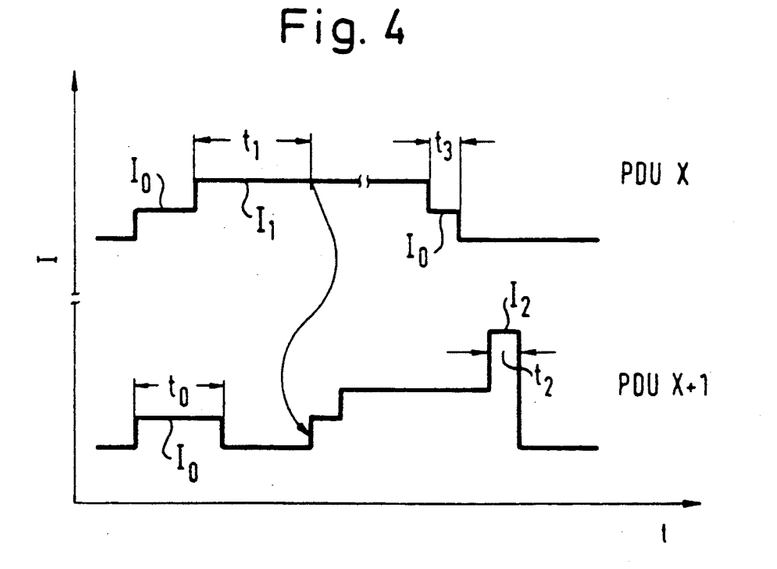
FIG. 4 is a diagram illustrating the variation in respect of time of the power consumption of two selected drive roller units when they are switched on, and FIG. 5 is a diagram illustrating the variation in respect of time of the power consumption of the individual drive roller units shown in FIG. 1.

Reference will now be to FIG. 4 showing the variations in motor currents of first and second adjacent drive roller units, as indicated by PDU x and PDU x+1. With each joystick command, firstly all the drive roller units involved are switched on, as indicated by the current $I_O$. If in that situation one drive roller unit, being in this case the unit x+1, remains non-loaded and only consumes the current $I_O$, that unit is switched off again after a predetermined period of time as indicated by $t_O$. If however a unit which is switched on, being in this case the unit x, is under a normal loading, so that after a short period of time its motor current rises to $I_1$, then after a period of time as indicated at $t_1$ a switch-on command is passed along to the next following drive roller unit, which in FIG. 4 is the unit x+1.

As it is undesirable that drive roller units which, after a freight container has moved therebeyond, no longer contribute for that reason to conveying of the freight container, should continue to operate in an idle condition and thus consume energy, the control logic circuit provides that the operating condition 'without load' is terminated after the motor current drops from the value $I_1$ to the value $I_O$, after a period of time as indicated at $t_3$ of for example 1.5 seconds, if within that period of time the system does not return to the condition 'normal load' again (motor current again rises to $I_1$), as is illustrated in respect of the unit x, due to the next freight container to be conveyed coming into engagement with the respective drive roller unit.

The electronic control arrangements of the individual drive roller units are wired together in such a way that the drive roller units which are operable to convey in the longitudinal direction of the conveying surface only react to 'FORWARD-REARWARD' commands from the control lever or joystick JS, while the drive roller units A, B and C which are operable to convey in the transverse direction only respond to ON-OFF commands. All selected drive roller units are switched on for a predetermined period of time of about 1.5 seconds, after each fresh joystick command, having regard to the above-described logic conditions. If the drive roller unit remains in the operating condition 'without load' within that period of time or if it passes into the 'stall' condition, then the motor is switched off.

Under normal conditions of operation, a drive roller unit is switched on again when the operating condition signal from the adjacent drive roller units shows that the operating condition 'normal load' has occurred for a predetermined period of time. In this connection, the reference to an 'adjacent' drive roller unit means the drive roller unit which precedes or follows in the direction of conveying movement, naturally in dependence on the drive command corresponding to the direction of conveying movement. If the motor current of a drive roller unit goes from the operating condition 'normal load' into the operating condition 'without load' for a predetermined time, then that unit is in turn switched off.

Figure 5:
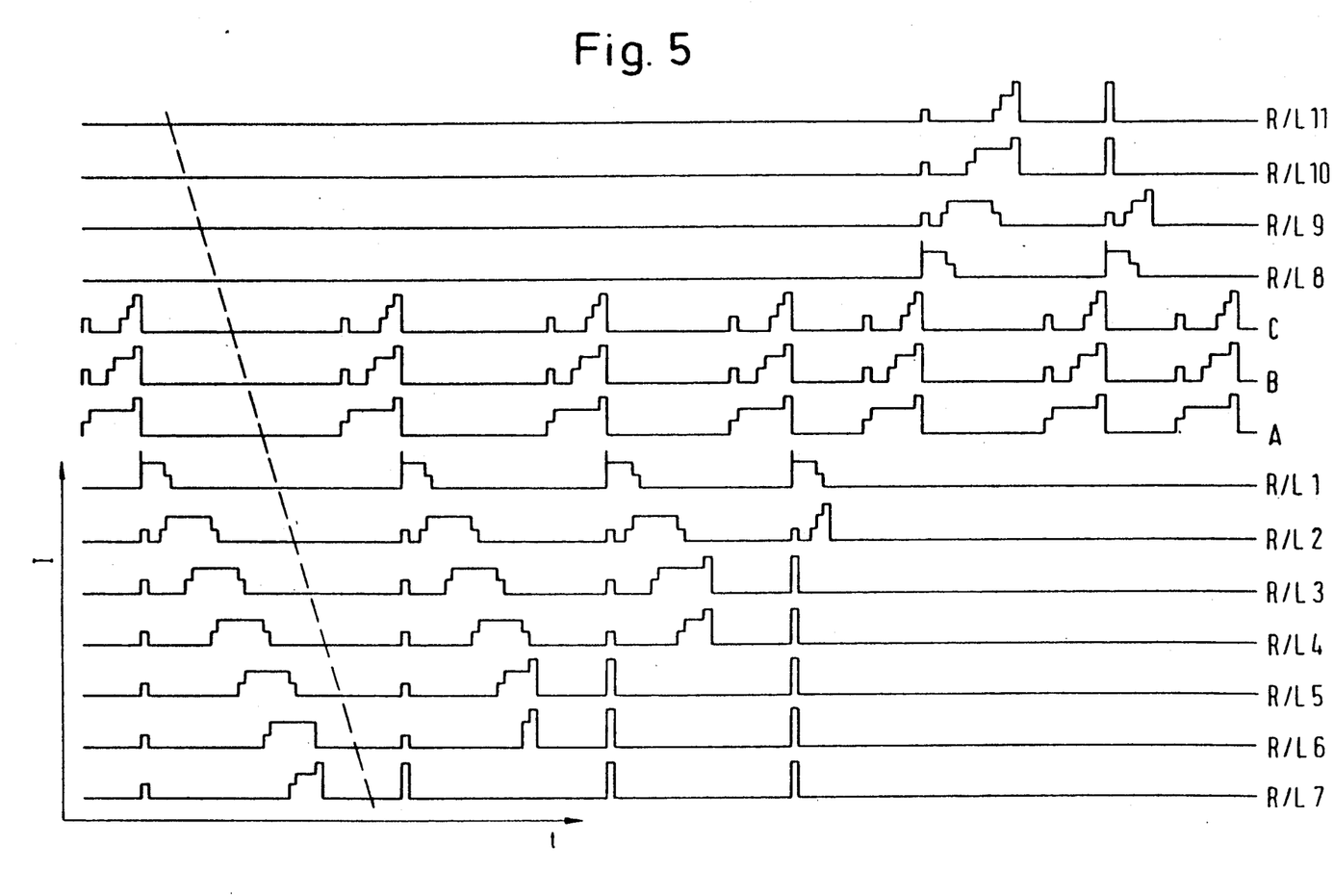

Reference will now be made to FIG. 5 which shows that sequence of successive drive roller units being switched on and off, by illustrating the variation in respect of time of the individual motor currents. The part in FIG. 5 which is to the left of the inclined dash-dotted line represents the variations in current of the individual drive roller units, which occur when a single freight container is moved into the freight compartment, as far as the drive roller unit indicated at R7, which is disposed immediately adjacent the front wall indicated at 32 in FIG. 1. The current patterns which are to the right of the inclined dash-dotted line in FIG. 5 relate to the movement of further freight containers into the freight compartment, until the latter is filled. Here only the current configurations shown to the left of the inclined dash-dotted line will be considered:

When a freight container is being moved into the freight compartment, it first encounters the drive roller unit indicated at A which logically without delay goes from the condition 'without load' into the condition 'normal load'. The short pulses at the beginning of the current curve in respect of the drive roller units C and B in FIG. 5 on the other hand show that the freight container has not yet reached them and therefore they have not gone into the 'normal load' condition and accordingly the respective drive units are switched off again. It is only when the freight container reaches the drive units B and C respectively that, after a command for switching on the respective unit again, coming from the preceding unit A or B respectively (as described above with reference to FIG. 4) that the current from B or C goes into the condition 'normal load' and finally all three drive roller units A, B and C go into the 'stall' condition because the freight container is bearing against the side wall 31 of the aircraft freight compartment. The current is therefore switched off in all three drive roller units A, B and C.

Up to that moment, the other drive roller units which are operable to convey in the longitudinal direction were lowered and switched off, under the control of the control logic circuit 56. Now however those longitudinally conveying drive roller units are enabled while the other transversely conveying drive roller units A, B and C are lowered and blocked. The freight container which is now disposed over the drive roller units in the freight compartment door region can now be conveyed in the longitudinal direction of the freight compartment. The initial acceleration which is required to begin that movement of the container is produced by means of the drive roller unit indicated at R1 in FIG. 1 which therefore initially shows a switch-on current peak after which it goes into the condition 'normal load'; it signals that situation to the next following drive roller unit R2. That drive roller unit R2 is still in an idle condition and therefore was switched off after about one and a half seconds, as indicated by the short current pulse in FIG. 5. It is only when the container which is being conveyed by the drive roller unit R1 applies a loading to the drive roller unit R2, after a command for switching on the latter again, which is produced by the preceding drive roller unit R1, that the current of the drive roller unit R2 rises to the condition 'normal load', in which case it then transmits that condition to the next following drive roller unit, as already described above. The switch-on current peak which was referred to above in connection with the drive roller unit R1 does not occur here because the container is already moving and does not first have to be accelerated from a rest position or a 'standing start'.

As the current diagram in FIG. 5 shows, in that way one drive roller unit after the other is set in operation until the drive roller unit R7 is reached and the container is thus conveyed in the longitudinal direction of the freight compartment towards the front wall 32 thereof until it encounters that front wall and as a result the drive roller unit R7 is put into the 'stall condition', whereupon it is switched off. A further freight container can now be introduced, as is shown by virtue of the current curve configurations in FIG. 5, to the right of the inclined dash-dotted line.

It will be appreciated that the above-described embodiment of the present invention has been set forth solely by way of example and illustration thereof and that various modifications and alterations may be made therein without thereby departing from the spirit and scope of the invention.

What is claimed is:

1. A control assembly for drive roller units (A, B, C; R1-R11, L1-L11) which are arranged in a distributed array over a conveyor surface (30) in a freight loading system and each of which is provided with an electric motor (57) for the drive thereof, wherein:
   an electronic control arrangement (40) is operatively associated with each drive roller unit (A, B, C; R1-R11, L1-L11);
   each control arrangement (40) has sensor means (43, 52) for detecting at least one operating parameter characterizing an instantaneous operating condition of the associated drive roller unit, said sensor means (43, 52) including a current sensor (43) for detecting the instantaneous current of the motor (57) of the associated drive roller unit (40);
   each control arrangement (40) includes means for forming information signals for the control arrangements (40) of other drive roller units from signals outputted by said sensor means (43, 52) and for passing said information signals to said other control arrangements (40), said means for forming information signals comprising means for processing the output signals of the current sensor (43) to provide an information signal for an operating condition "off" when no current is flowing, an information signal for an operating condition "without load" at a current of a predetermined first strength, an information signal for an operating condition "normal load" at a current of a predetermined second strength, and an information signal for an operating condition "enforced stoppage" at a current of a third strength which occurs when the electric motor (57) is braked to a standstill by an excessive loading on the drive roller unit;

each control arrangement (40) further includes means for receiving corresponding information signals about the respective operating conditions of other drive roller units, which signals are transmitted from said other control arrangements (40) of said other drive roller units to the first-mentioned control arrangement (40); and each electronic control arrangement (40), on the basis of the information signals passed to it about the respective operating condition of the drive roller units, accepts or suppresses control signals which are fed thereto by external control members (JS, PB).

2. A control assembly as set forth in claim 1 wherein the electronic control arrangement (40) has means for switching off the motor (57) in the operating condition 'without load' and in the operating condition 'enforced stoppage' after respective predetermined periods of time.

3. A control assembly as set forth in claim 1 for a drive roller unit having a drive roller and means for displacing the drive roller between a lowered rest position and a raised operative position in which it is pressed against an article to be conveyed on the conveyor surface (30), wherein said sensor means (43, 52) includes a further sensor (52) adapted to supply information signals in respect of operating conditions 'drive roller lowered' and 'drive roller raised'.

4. A control assembly as set forth in claim 3 wherein said further sensor (52) is a microswitch.

5. A control assembly as set forth in claim 1 for drive roller units (A, B, C; R1-R11, L1-L11) at a conveyor surface (30) at which there is provided a door region (34) for the movement of articles therethrough, wherein provided in said door region (34) are first drive roller units (A, B, C) for transverse conveying relative to said conveyor surface and adjacent to same are second drive roller units (R1, R8, L1, L8) for longitudinal conveying at an angle to the transverse conveying and wherein the rest of the conveyor surface (30) which adjoins the door region (34) only has only third drive roller units (R2-R7, R9-R11; L2-L7, L9-L11) for longitudinal conveying, wherein each control arrangement of the first drive roller units (A, B, C) has means for suppressing control signals of an external control member (JS) for controlling the inward/outward conveying operation of the respective first drive roller unit (A, B, C) until the information signal 'drive roller lowered' is respectively transmitted to said control arrangements by all second drive roller units (R1, R8, L1, L8) disposed in the door region (34), and each control arrangement of the second and third drive roller units (R1-R11, L1-L11) has means for suppressing control signals of an external control member (JS) for controlling the forward/rearward conveying operation of the second and third drive roller units (R1-11; L1-L11) until the information signal 'drive roller lowered' is transmitted to those control arrangements by all first drive roller units (A, B, C) in the door region (34).

6. A control assembly as set forth in claim 5 wherein drive roller units having a common conveying direction are connected in series with their electrical control arrangements in respect of the exchange of given operating condition information signals.

* * * * *